(12) United States Patent
Gdula et al.

(10) Patent No.: US 12,367,424 B1
(45) Date of Patent: Jul. 22, 2025

(54) DATA PREFILTERING FOR LARGE SCALE DATA CLASSIFICATION

(71) Applicant: CrowdStrike, Inc., Sunnyvale, CA (US)

(72) Inventors: Olga Gdula, Reading (GB); Felix Schwyzer, Berlin (DE); Calin-Bogdan Miron, Nottingham (GB)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/818,342

(22) Filed: Aug. 28, 2024

(51) Int. Cl.
*G06N 20/00* (2019.01)
*H04L 9/40* (2022.01)

(52) U.S. Cl.
CPC .......... *G06N 20/00* (2019.01); *H04L 63/1416* (2013.01)

(58) Field of Classification Search
CPC ............................ G06N 20/00; H04L 63/1416
See application file for complete search history.

(56) References Cited

U.S. PATENT DOCUMENTS

| | | | |
|---|---|---|---|
| 7,213,260 B2 * | 5/2007 | Judge | H04L 63/1408 726/22 |
| 2007/0183655 A1 | 8/2007 | Konig et al. | |
| 2012/0004893 A1 * | 1/2012 | Vaidyanathan | G16H 50/50 703/11 |
| 2016/0226890 A1 | 8/2016 | Harang | |
| 2020/0382527 A1 * | 12/2020 | Mitelman | G06N 20/20 |
| 2021/0406368 A1 | 12/2021 | Agranonik et al. | |
| 2022/0353284 A1 * | 11/2022 | Voros | H04L 63/1441 |
| 2022/0398491 A1 * | 12/2022 | Khanna | G06F 17/18 |
| 2023/0344843 A1 * | 10/2023 | Zaytsev | H04L 63/145 |

OTHER PUBLICATIONS

Thaler, Stefan, Vlado Menkovski, and Milan Petkovic. "Deep learning in information security." arXiv preprint arXiv:1809.04332 (2018). (Year: 2018).*

Uzun, Birnur, and Serkan Balli. "Performance evaluation of machine learning algorithms for detecting abnormal data traffic in computer networks." 2020 5th International Conference on Computer Science and Engineering (UBMK). IEEE, 2020. (Year: 2020).*

Geng, Ye, et al. "An efficient network traffic classification method based on combined feature dimensionality reduction." 2021 IEEE 21st International Conference on Software Quality, Reliability and Security Companion (QRS-C). IEEE, 2021. (Year: 2021).*

(Continued)

*Primary Examiner* — Randall K. Baldwin
(74) *Attorney, Agent, or Firm* — Lee & Hayes, P.C.

(57) ABSTRACT

Data prefiltering techniques for large scale data classification are disclosed herein. According to an implementation, a machine learning (ML) model can be trained to classify data elements. The ML model can be applied to a first data volume, resulting in determinations of data elements that belong in a relevant classification. The determined data elements can then be used to configure a prefilter. The prefilter can be applied to a second data volume to identify filtered data elements of types that are similar to the determined data elements. The filtered data elements can be provided to the ML model for classification.

20 Claims, 6 Drawing Sheets

(56) References Cited

OTHER PUBLICATIONS

Qiang, Chen Qiang, et al. "Ensemble Method For Net Traffic Classification Based on Deep Learning." 2021 18th International Computer Conference on Wavelet Active Media Technology and Information Processing (ICCWAMTIP). IEEE, 2021. (Year: 2021).*
Lohani, Anuj, et al. "Static Heuristics Classifiers as Pre-Filter for Malware Target Recognition (MATR)." American Journal of Networks and Communications 4.3 (2015): 44-48. (Year: 2015).*
Pirscoveanu et al., "Analysis of Malware Behavior: Type Classification using Machine Learning," in the Proceedings of 2015 International conference on cyber situational awareness, data analytics and assessment (CyberSA), Jun. 2015, pp. 1-7.

* cited by examiner

DATA PREFILTERING FOR LARGE SCALE DATA CLASSIFICATION

BACKGROUND

Machine learning (ML) techniques can provide powerful tools for data classification. For example, consider a stream of data that is indicative of processes and events occurring in one or more computing devices of a computer network. A ML model can be trained to evaluate such a data stream and identify suspicious patterns which may potentially be attributed to malicious activity. Potential malicious activity can be flagged and addressed, providing significant risk reduction for businesses and other entities that rely on computer networks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Evaluating a data stream can be hindered by a large volume of data in the data stream. It can be prohibitively expensive, from a computational standpoint, to perform applicable steps to prepare all of the data in the data stream for ML classification, and to subsequently run the ML model on the resulting prepared data. Therefore, there is a need for approaches to leverage the power of ML for data classification while also reducing data volumes to limit the computational expense of preparing data and running the ML classification.

Data prefiltering techniques for large scale data classification are disclosed herein. In an example, a ML model can be trained to classify data elements. The ML model can be applied to a first data volume, resulting in determinations of data elements that have at least a threshold level of confidence to belong in a relevant classification. The determined data elements can then be used to configure a prefilter that can be applied to a second data volume, e.g., a very large second data volume. The prefilter can identify, within the second data volume, filtered data elements of types that share one or more properties with the determined data elements. The resulting filtered data elements present a reduced data volume of a size that can be evaluated by the ML model at reduced computational expense. The filtered data elements can be provided to the ML model for classification, and the ML model can make classification determinations on the filtered data elements.

In an example, the data prefiltering techniques described herein can be applied by a cloud-based service which receives telemetry data from one or more client networks. The cloud-based service can be configured to process the telemetry data to identify potentially malicious activity in the client networks.

The telemetry data can include information regarding processes and events occurring in the client networks. The telemetry data can optionally be assembled into "process trees" which generally group related processes (such as child, sibling, parent, grandparent, and other ancestor processes) as well as events associated with the related processes. The process trees can be usefully evaluated by a trained ML model that is trained to classify process trees according to security risk. In some implementations, process tree classification can be "binary", e.g., by classifying them as either benign or malicious. In other implementations, process tree classification can be "multiclass", e.g., by classifying them as benign, malicious type 1, malicious type 2, . . . , etc. In further implementations, process tree classification can be "multilabel", e.g., by assigning multiple different labels to a same process tree or event. Process tree classification can furthermore comprise assigning confidence values that indicate a confidence in a process tree classification, e.g., confidence in the process tree being associated (or conversely, not being associated) with a malicious process or activity.

However, for very large volumes of telemetry data, assembling telemetry data into process trees and subsequent ML classification of the process trees can be too computationally expensive to perform on all the telemetry data. Therefore, the data prefiltering techniques described herein can be applied to configure a prefilter, and the prefilter can be used to filter the telemetry data, thereby reducing the volume of telemetry data to be assembled into process trees and submitted to the ML model for classification. While the techniques described herein may be usefully applied in the context of telemetry data, they are not limited to the telemetry data examples described herein and can be also applied to reduce data volumes in other scenarios including large amounts of data for ML classification.

In cybersecurity, there is interest in classifying event trees and process trees, referred to collectively herein as process trees. Process trees can comprise indications of processes along with information about their lineage, such as an event's or process' siblings, parents, grandparents, and/or other ancestors. The aim of such classification is to use ML models to determine whether a particular process tree should be regarded as suspicious (potentially associated with malicious activity by a threat actor), or whether it should be regarded as benign (normal behavior). This is of particular interest in detecting "living off the land" attacks, in which the attackers leverage tools commonly available on computer systems, such as built-in WINDOWS® binaries, to achieve malicious aims.

However, the task of classifying process trees is hindered by their sheer volume, which makes it prohibitively costly to run ML classification on every tree in a process tree stream. Embodiments of this disclosure can therefore provide, inter alia, a workflow which reduces the cost of operating a ML classifier for process trees at scale, while aiming to preserve those detections which the ML model is most confident about. The volume of a data stream sent to a ML classifier can be reduced though the use of a prefilter which is configured based on historical detections identified by the ML classifier with threshold sufficient confidence.

An example workflow can include, first, training a ML classifier on a dataset of process trees. Training can be performed through supervised ML on a labeled set of process trees, or through unsupervised ML on an unlabeled set of process trees. The ML classifier can be provided with process trees as inputs, can evaluate the process trees, and can output confidence values indicating the ML classifier's confidence in its classification determination. In one example, the ML classifier can output confidence values indicating the ML classifier's confidence regarding whether the input process trees should be regarded as associated with malicious activity. In another example, the ML classifier can output confidence values indicating the ML classifier's confidence regarding whether the input process trees should be regarded as benign activity. Classification determinations can be binary or can be multiclass or multilabel, as described herein, and confidence values can be output for any classification determinations.

Next, a threshold confidence value can be selected. Process trees with confidence values that satisfy the threshold confidence value can be considered malicious with sufficient confidence, while process trees with confidence values that do not satisfy the threshold confidence value can be considered not malicious with sufficient confidence. Different threshold confidence values can be selected for different implementations, understanding that higher threshold confidence values will achieve greater reductions in data volumes and corresponding reductions in computational expense, while lower threshold confidence values will result in smaller reductions in data volumes and corresponding more thorough and more expensive data evaluation.

Next, the ML classifier can be deployed to classify a set of subsampled process trees, e.g., process trees in a live data stream for a limited period of time or process trees in a batch of recent data. This set of subsampled process trees can be smaller than the full volume of data expected in production. The aim is to use the set of subsampled process trees to develop a prefilter for reduction of ML input data. The prefilter can be based on the ML classifier's predictions on the set of subsampled process trees.

Next, the prefilter can be configured by profiling the types of process trees (from the set of subsampled process trees) for which the ML classifier's predictions pass the threshold confidence value. Prefilter configuration can comprise performing a statistical analysis of the types of process trees for which the ML classifier's predictions pass the threshold confidence value, and the types of process trees for which the ML classifier's predictions do not pass the threshold confidence value. The prefilter can optionally be based on fields used in the ML classifier's predictions, or on other fields in the process trees. One aim of prefilter configuration can be providing a simple, low cost reduction of data volume, so that the ML classifier can be applied to a reduced volume data.

Next, the prefilter and the ML classifier can be placed into production to process a live stream of data at production scale. Process tree data in the live stream of data can be initially processed by the prefilter, resulting in a reduced volume of filtered data. The ML classifier can be applied to the reduced volume of filtered data, resulting in classification outputs that assign confidence values to process trees, as described above.

In an aspect, workflows such as described above can add a prefilter configured to reduce the volume of process tree data for processing by a ML classifier. The design of the prefilter can be driven by statistically analyzing process trees identified by the ML classifier.

Using the techniques described herein, process tree data which is unlikely to yield a detection (e.g., a ML classifier confidence value which satisfies the threshold confidence value) can be omitted from processing by the ML classifier. Meanwhile, process trees which are more likely to yield a detection (e.g., a ML classifier confidence value which satisfies the threshold confidence value) can be provided to the ML classifier for evaluation.

In this way, instead of running relatively costly ML analysis on a full volume of process tree data, the prefilter with simpler logic, which is less expensive to run, replaces the ML classifier for a subset of process tree data, resulting in a smaller volume of process tree data being scanned by the ML classifier. Because the prefilter is based on statistical analysis of process trees identified by the ML classifier, incorporates some of the information and learning of the ML classifier itself.

Example implementations are provided below with reference to the following figures.

Figure 1:
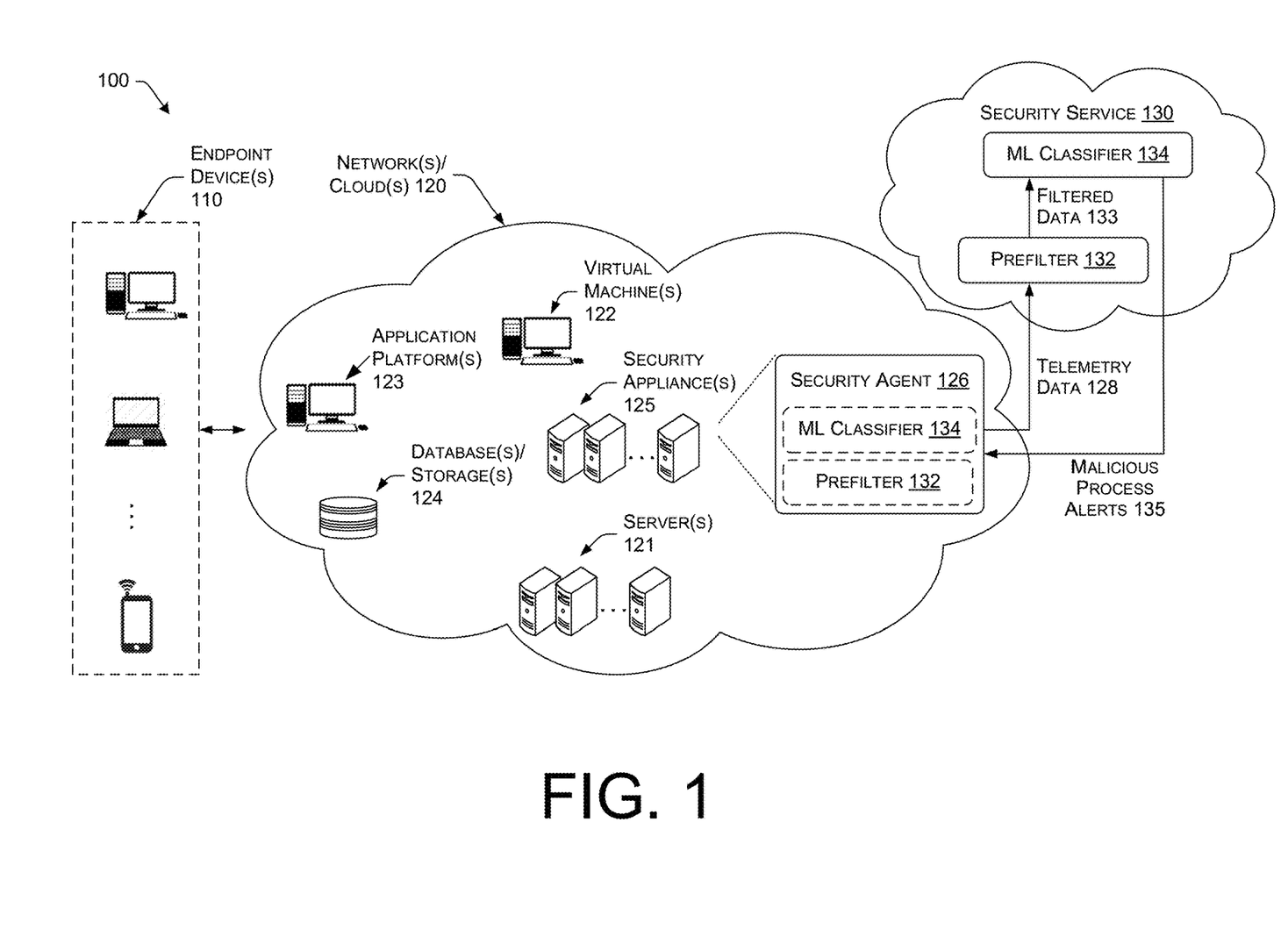
FIG. 1 illustrates an example network environment comprising a security agent, wherein the security agent sends telemetry data to a security service for classification thereof, in accordance with an embodiment of the present disclosure.

FIG. 1 illustrates an example network environment 100 comprising a security agent 126, wherein the security agent 126 sends telemetry data 128 to a security service 130 for classification thereof, in accordance with an embodiment of the present disclosure.

FIG. 1 comprises endpoint device(s) 110, network(s)/cloud(s) 120, and a security service 130. The network(s)/cloud(s) 120 includes server(s) 121, virtual machine(s) 122, application platform(s) 123, database(s)/storage(s) 124, and security appliance(s) 125. The security appliance(s) 125 can comprise the security agent 126. Alternatively, the security agent 126 can be implemented at any devices in the network(s)/cloud(s) 120 or in the endpoint device(s) 110.

In some examples, the security agent 126 can be configured to detect processes that execute within the network(s)/cloud(s) 120, as well as activities of the processes, referred to as events. The security agent 126 can send detected information as telemetry data 128 to the security service 130. The security service 130 can be configured to analyze the telemetry data 128 and determine whether any of the telemetry data 128 is indicative of potentially malicious activity in the network(s)/cloud(s) 120. If potentially malicious activity, such as a malicious process, is discovered by the security service 130, then the security service 130 can send malicious process alerts 135 to the security agent 126. The security agent 126 can be configured to optionally conduct further analysis and take preventive actions as needed to protect the network(s)/cloud(s) 120 from attack.

The security service 130 can comprise a prefilter 132 and a ML classifier 134. The prefilter 132 can be configured to filter the telemetry data 128, resulting in filtered data 133. The filtered data 133 therefore comprises a reduced data volume that includes some, but not all data elements included in the telemetry data 128. For example, the filtered data 133 can include data elements that are associated with at least some threshold likelihood or confidence of being potentially associated with malicious activity.

The ML classifier 134 can be configured to evaluate the filtered data 133 in order to determine classification information for the filtered data 133. If any of the filtered data 133 is classified by the ML classifier 134 as being potentially associated (at a sufficient confidence) with malicious activity, then the security service 130 can generate and send malicious process alerts 135 to the security agent 126.

In an aspect of this disclosure, the prefilter 132 can be configured at least on part based on previous classifications performed by the ML classifier 134. A prefilter configuration workflow is disclosed herein which usefully incorporates classification information from the ML classifier 134. Prefilter 132 configuration can also be manually adjusted, e.g., by security analysts, as needed to either include or omit certain data elements in the filtered data 133.

The prefilter 132 and the ML classifier 134 are also illustrated in dashed lines within the security agent 126. It should be understood that in some implementations, the prefilter 132 and the ML classifier 134 can be implemented within the security agent 126 or otherwise within the network(s)/cloud(s) 120. The prefilter 132 and the ML classifier 134 can perform as described herein regardless of where the components are located.

In further aspects of FIG. 1, the one or more endpoint device(s) 110 can access, through a network, a variety of resources located in the network(s)/cloud(s) 120. The one or more security appliance(s) 125 can optionally be configured to provide security functions for devices in the network(s)/cloud(s) 120 as well as for endpoint device(s) 110, such as an intrusion detection or prevention system (IDS/IPS), denial-of-service (DOS) attack protection, session monitoring, and other security services. The security agent 126 can comprise a variety of functions that facilitate security of network(s)/cloud(s) 120. In an example, the security agent 126 can be implemented as a FALCON® type agent made by the CROWDSTRIKE® Corporation, and the network(s)/cloud(s) 120 can comprise a private network operated by a business, university, government agency or other entity.

In various examples, the endpoint device(s) 110 can comprise any devices that can connect to the networks/cloud(s) 120, either wirelessly or via direct cable connections. For example, the endpoint device(s) 110 may include but are not limited to mobile telephones, personal digital assistants (PDAs), media players, tablet computers, gaming devices, smart watches, hotspots, personal computers (PCs) such as laptops, desktops, or workstations, or any other type of computing or communication device. In other examples, the endpoint device(s) 110 may comprise vehicle-based devices, wearable devices, wearable materials, virtual reality (VR) devices, smart watches, smart glasses, clothes made of smart fabric, etc.

In various examples, the network(s)/cloud(s) 120 can be a public cloud, a private cloud, or a hybrid cloud and may host a variety of resources such as one or more server(s) 121, one or more virtual machine(s) 122, one or more application platform(s) 123, one or more database(s)/storage(s) 124, etc. The server(s) 121 may include the pooled and centralized server resources related to application content, storage, and/or processing power. The application platform(s) 123 may include one or more cloud environments for designing, building, deploying and managing custom business applications. Virtual desktop(s) may image operating systems and applications of a physical device, e.g., any of endpoint device(s) 110, and allow users to access their desktops and applications from anywhere on any kind of endpoint devices. The database(s)/storage(s) 124 may include one or more of file storage, block storage or object storage.

It should be understood that the one or more server(s) 121, one or more virtual machine(s) 122, one or more application platform(s) 123, and one or more database(s)/storage(s) 124 illustrate multiple functions, available services, and available resources provided by the network(s)/cloud(s) 120.

Although shown as individual network participants in FIG. 1, the server(s) 121, the virtual machine(s) 122, the application platform(s) 123, and the database(s)/storage(s) 124 can be integrated and deployed on one or more computing devices and/or servers in the network(s)/cloud(s) 120.

In implementations, the security appliance(s) 125 can comprise any types of firewalls. Example firewalls include a packet filtering firewall that operates inline at junction points of network devices such as routers and switches. A packet filtering firewall can compare each packet received to a set of established criteria, such as the allowed IP addresses, packet type, port number and other aspects of the packet protocol headers. Packets that are flagged as suspicious are dropped and not forwarded. Example firewalls may further include a circuit-level gateway that monitors transmission control protocol (TCP) handshakes and other network protocol session initiation messages across the network to determine whether the session being initiated is legitimate. Example firewalls may further include an application-level gateway (also referred to as a proxy firewall) that filters packets not only according to the service as specified by the destination port but also according to other characteristics, such as the hypertext transfer protocol (HTTP) request string. Yet another example firewall may be a stateful inspection firewall that monitors an entire session for a state of a connection, while also checking internet protocol (IP) addresses and payloads for more thorough security. A next-generation firewall, as another example firewall, can combine packet inspection with stateful inspection and can also include some variety of deep packet inspection (DPI), as well as other network security systems, such as IDS/IPS, malware filtering and antivirus functions.

In various examples, the security appliance(s) 125 can be deployed as one or more hardware-based appliances, software-based appliances, and/or cloud-based services. A hardware-based appliance may also be referred to as network-based appliance or network-based firewall. The hardware-based appliance can act as a secure gateway between the networks/cloud(s) 120 and the endpoint device(s) 110 and can protect the devices/storages inside the perimeter of the networks/cloud(s) 120 from being attacked by malicious actors.

Additionally or alternatively, the security appliance(s) 125 can be implemented on a cloud device. The security appliance(s) 125 can comprise or can cooperate with a cloud-based security service 130 provided through a managed security service provider (MSSP). A cloud-based service can be delivered to various network participants on demand and configured to track both internal network activity and third-party on-demand environments. In some examples, the security appliance(s) 125 can comprise software-based appliances implemented in part on any of the devices in the network(s)/cloud(s) 120 and/or on the endpoint device(s) 110. Software-based appliances may also be referred to as host-based appliances or host-based firewalls. Software-based appliances may include the security agent 126 or portions thereof, anti-virus software, firewall software, etc., that can be installed on devices in the network(s)/cloud(s) 120 and/or on the endpoint device(s) 110.

In FIG. 1, the security appliance(s) 125 are shown as individual devices and/or individual cloud participants. However, it should be understood that the network environment 100 may include multiple security appliance(s) respectively implemented on the endpoint device(s) 110 and/or the network(s)/cloud(s) 120. As discussed herein, the security appliance(s) 125 can comprise a hardware-based firewall, a software-based firewall, a cloud-based firewall, or any combination thereof, in addition to the dynamic asset inventory function 127.

Figure 2:
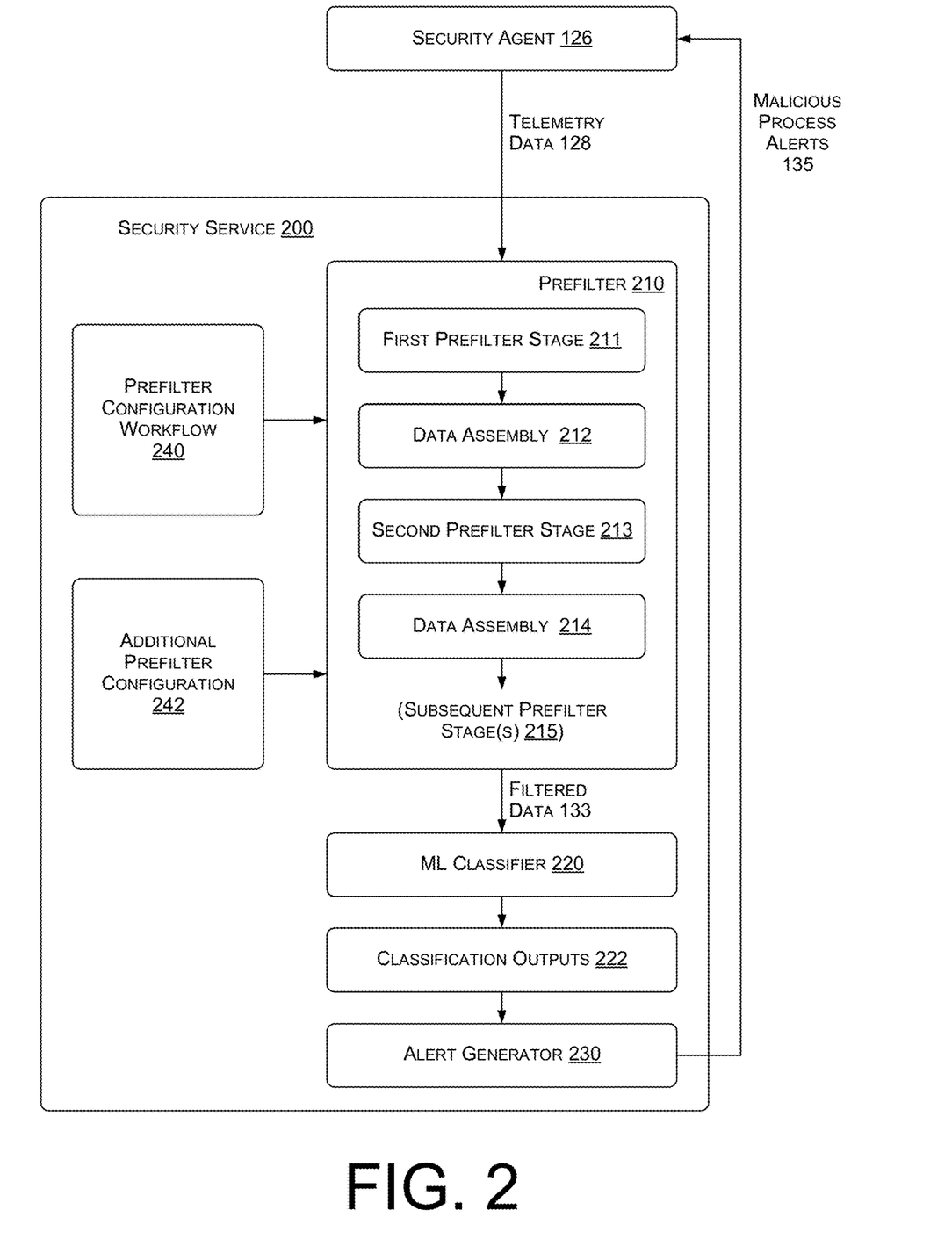
FIG. 2 illustrates an example security service comprising a prefilter and a ML classifier, in accordance with an embodiment of the present disclosure.

FIG. 2 illustrates an example security service 200 comprising a prefilter 210 and a ML classifier 220, in accordance with an embodiment of the present disclosure. The security service 200 can implement the security service 130 introduced in FIG. 1, the prefilter 210 can implement the prefilter 132 introduced in FIG. 1, and the ML classifier 220 can implement the ML classifier 134 introduced in FIG. 1 in some examples. In this regard, the security service 200 can receive telemetry data 128 from the security agent 126 introduced in FIG. 1, and the security service 200 can provide malicious process alerts 135 to the security agent 126, as described with reference to FIG. 1.

In addition to the prefilter 210 and the ML classifier 220, the example security service 200 includes a prefilter configuration workflow 240 and additional prefilter configuration 242. The prefilter configuration workflow 240 and additional prefilter configuration 242 can configure the prefilter 210, as described further with reference to FIG. 3. The example security service 200 furthermore includes classification outputs 222 and alert generator 230, which can be used in connection with generating and sending the malicious process alerts 135.

The example prefilter 210 is configured as a multistage prefilter including a first prefilter stage 211, data assembly 212, an optional second prefilter stage 213, data assembly 214, and optional subsequent prefilter stage(s) 215 as applicable for different prefilter embodiments. In general, the first prefilter stage 211 can allow some of the telemetry data 128 while excluding other telemetry data 128. The resulting allowed data can be optionally assembled at data assembly 212, e.g., by organizing the resulting allowed data and optionally determining connections between the resulting allowed data. Data assembly 212 can output assembled first stage data.

The second prefilter stage 213 can allow some of the assembled first stage data while excluding other assembled first stage data. The resulting allowed data can be optionally assembled at data assembly 214, e.g., by organizing the resulting allowed data and optionally determining connections between the resulting allowed data. Data assembly 214 can output assembled second stage data.

Similarly, optional subsequent prefilter stage(s) 215 can allow some of the assembled second stage data while excluding other assembled second stage data. The resulting allowed data can be optionally assembled at further data assembly operations, e.g., by organizing the resulting allowed data and optionally determining connections between the resulting allowed data. The final output from the prefilter 210, after completion of applicable prefilter stages, can comprise the filtered data 133.

In an example, the telemetry data 128 may include process identifiers of processes executed at the network(s)/cloud(s) 120 introduced in FIG. 1. The first prefilter stage 211 can use a first "allow list" to allow some process identifiers, while excluding other process identifiers. Conversely or additionally, the first prefilter stage 211 can use a first "exclusions list" to exclude some process identifiers, while allowing other process identifiers. The resulting allowed data can be optionally assembled at data assembly 212, e.g., by identifying parent processes associated with the processes identified in the resulting allowed data. Data assembly 212 can output assembled first stage data including process identifiers along with associated parent process information.

The second prefilter stage 213 can use a second "allow list" and/or "exclusions list" to allow some of the assembled first stage data while excluding other assembled first stage data, e.g., allowing some process identifier/parent process combinations, while excluding other process identifier/parent process combinations. The resulting allowed data can be optionally assembled at data assembly 214, e.g., by identifying grandparent processes associated with the processes identified in the resulting allowed data. Data assembly 214 can output assembled second stage data including process identifiers along with associated parent and grandparent process information.

The above example can be extended to further ancestor processes, as well as to other information fields, such as events associated with processes, timing information, sequencing information, and any other information fields. The resulting filtered data 133 can comprise a reduced data volume that presents a desired threshold level of confidence of being determined to be in a target classification of the ML classifier 220, e.g., being classified as malicious.

Furthermore, the filtered data 133 can be assembled by the various data assembly operations of the prefilter 210, so that the filtered data 133 is ready for processing by the ML classifier 220. For example, when the data assembly operations identify parent, grandparent, and other ancestor information related to a process, the filtered data 133 can include process trees which include the associated parent, grandparent and other ancestor information, and the ML classifier 220 can be configured for evaluation of process trees optionally along with other related event information and/or other fields.

The ML classifier 220 can comprise any type of trained ML model. A variety of different machine learning technologies are available, including neural networks, large language models, transformer type models, and many others. Any machine learning technology can be used to implement the ML classifier 220. The ML classifier 220 can process input data elements such as process trees included in the filtered data 133 and can output classification outputs 222, wherein the classification outputs 222 can comprise a classification output corresponding to each input data element.

In some embodiments, the classification outputs 222 can comprise confidence values associated with input data elements, wherein each respective confidence value represents a confidence that a respective input data element belongs in a target classification. For example, for process tree inputs and a target classification comprising a potentially malicious classification, the ML classifier 220 can output, for each input process tree, a confidence value representing a confidence that the input process tree is potentially malicious, i.e., the input process tree is associated with a malicious process or activity.

The alert generator 230 can be configured to process the classification outputs 222. For any classification output that is placed in a target classification by the ML classifier 220, such as by being associated with a confidence value that satisfies a threshold, the alert generator 230 can be configured to take an action such as generating and sending a malicious process alert to the security agent 126. Classification outputs that are not placed in the target classification by the ML classifier 220, such as by being associated with confidence values that do not satisfy the threshold, can be ignored by the alert generator 230.

Figure 3:
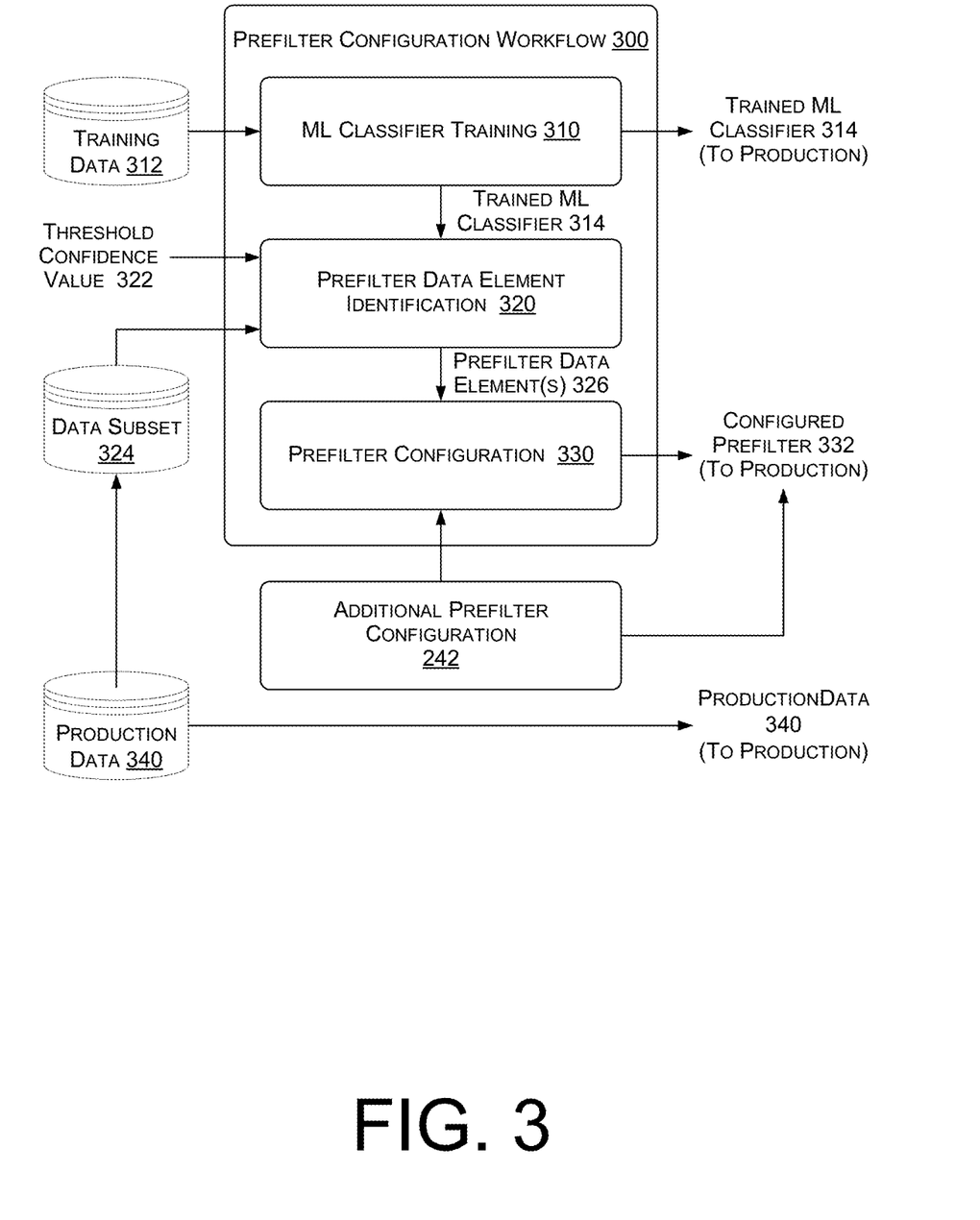
FIG. 3 illustrates an example prefilter configuration workflow, in accordance with an embodiment of the present disclosure.

FIG. 3 illustrates an example prefilter configuration workflow 300, in accordance with an embodiment of the present disclosure. The prefilter configuration workflow 300 can implement the prefilter configuration workflow 240 introduced in FIG. 2 in some embodiments. The prefilter configuration workflow 300 comprises ML classifier training 310, prefilter data element identification 320, and prefilter configuration 330.

Example inputs and outputs to the prefilter configuration workflow 300 are also illustrated in FIG. 3. Training data 312 can be used by ML classifier training 310 to generate a trained ML classifier 314. The trained ML classifier 314 can be used by the prefilter data element identification 320, and the trained ML classifier 314 can also be output to a production environment, e.g., to a security service 200 such as illustrated in FIG. 2, where the trained ML classifier 314 can be used as the ML classifier 220.

The prefilter data element identification 320 can be configured to run the trained ML classifier 314 on a data subset 324. The data subset 324 can comprise a subset of production data 340. The production data 340 can comprise, e.g., the telemetry data 128 illustrated in FIGS. 1 and 2. In some cases, the data subset 324 can comprise test data which is not necessarily a subset of the production data 340.

Outputs resulting from running the trained ML classifier 314 on the data subset 324 can comprise, e.g., classification information applicable to data elements (such as process trees) included in the data subset 324. In an example, the classification information can comprise confidence values associated with the data elements included in the data subset 324.

The prefilter data element identification 320 can furthermore be configured to apply a threshold confidence value 322 to the outputs from running the trained ML classifier 314 on the data subset 324. For example, using an example threshold confidence value 322 of 0.5, the prefilter data element identification 320 can include, in the prefilter data element(s) 326, data elements such as process trees that are associated with a confidence value of 0.5 or higher. Using an example threshold confidence value 322 of 0.75, the prefilter data element identification 320 can include, in the prefilter data element(s) 326, data elements such as process trees that are associated with a confidence value of 0.75 or higher.

Embodiments of this disclosure can use any threshold confidence value 322, understanding that more stringent (relatively higher) confidence values can be used to tighten the resulting prefilter to achieve larger reductions in data volumes, while less stringent (relatively lower) confidence values can be used to loosen the resulting prefilter to achieve smaller reductions in data volumes.

Prefilter data element(s) 326 identified at prefilter data element identification 320 can be provided to prefilter configuration 330. Prefilter configuration 330 can generate a configured prefilter 332 based on the prefilter data element(s) 326. The configured prefilter 332 can generally be configured to pass/accept data elements that share one or more properties with the prefilter data element(s) 326, while rejecting/excluding other data elements.

In an example, the prefilter configuration 330 can profile the types of process trees included in the prefilter data element(s) 326. Prefilter configuration 330 can perform a statistical analysis of the types of process trees included in the prefilter data element(s) 326. Example statistical analyses can identify either an absolute or a relative prevalence of different process tree types and can compare the absolute or relative prevalence against a prevalence threshold. Prefilter configuration 330 can also optionally perform a statistical analysis of the types of process trees that are not included in the prefilter data element(s) 326. Prefilter configuration 330 can optionally generate the configured prefilter 332 based on fields used in the trained ML classifier 314 predictions, or on other fields in the process trees.

Additional prefilter configuration 242 can optionally be performed at any stage. In some embodiments, additional prefilter configuration 242 can be performed on a prefilter configured at prefilter configuration 330, in order to finalize the configured prefilter 332 before it is provided to a production environment. In additional examples, additional prefilter configuration 242 can be performed on configured prefilter 332 after the configured prefilter 332 is active in the production environment. Additional prefilter configuration 242 can comprise, e.g., manually adding, modifying, or removing filter elements from the configured prefilter 332.

Figure 4:
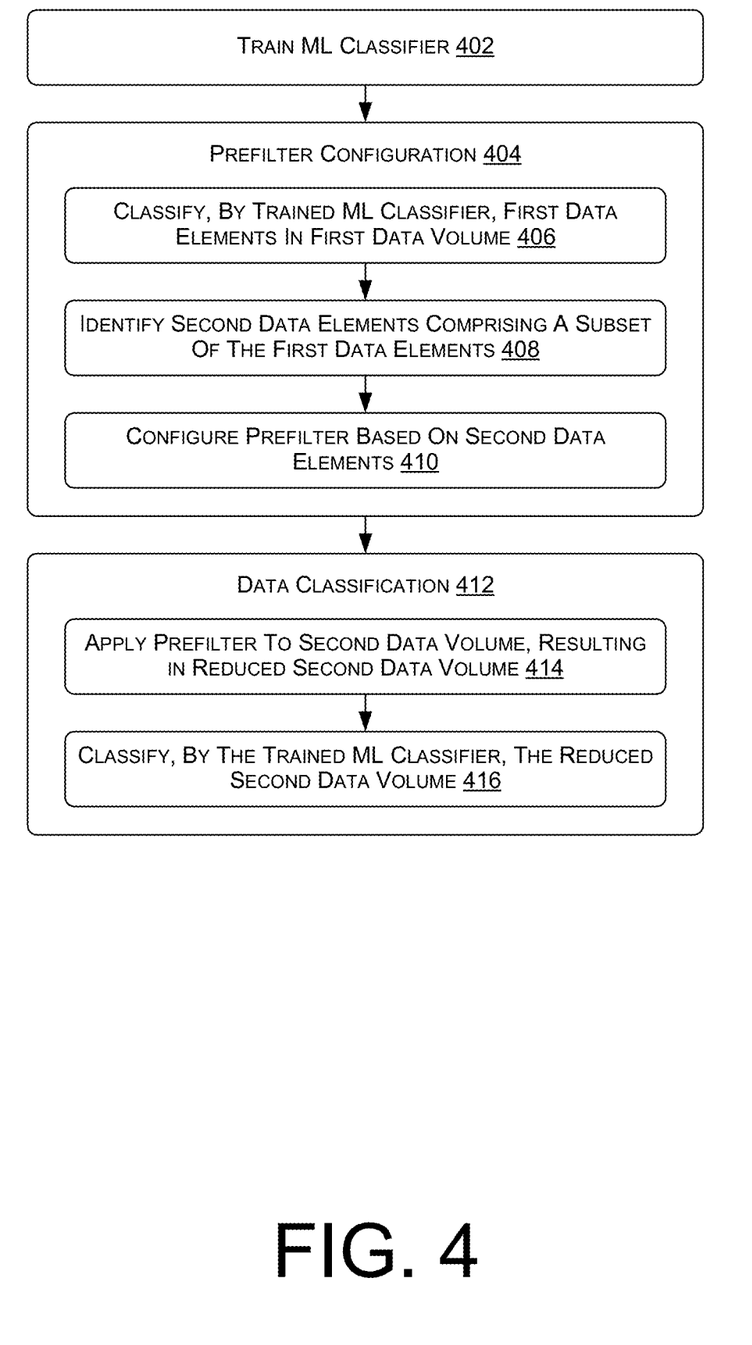
FIG. 4 illustrates an example process to configure and use a prefilter, in accordance with an embodiment of the present disclosure.

FIG. 4 illustrates an example process to configure and use a prefilter, in accordance with an embodiment of the present disclosure. By way of example and without limitation, the process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

The operations illustrated in FIG. 4 can be performed at least in part by a security service 200 such as illustrated in FIG. 2. At operation 402, a ML classifier can be trained on a training data volume such as the training data 312 illustrated in FIG. 3, resulting in a trained ML classifier.

FIG. 4 includes a first group of operations for prefilter configuration 404, and a second group of operations for data classification 412. Data classification 412 can generally apply, in a production context, a configured prefilter which is configured according to prefilter configuration 404. Prefilter configuration 404 can comprise example operations 406, 408, and 410, while data classification 412 can comprise example operations 414 and 416.

At operation 406, a prefilter configuration workflow 300 such as illustrated in FIG. 3 can apply the trained ML classifier output from operation 402 to classify first data elements in a first data volume. The first data volume can comprise, e.g., the data subset 324. The first data elements can comprise, e.g., process trees or other data elements. The trained ML classifier can classify the first data elements by assigning confidence values representing confidence that the first data elements belong in a classification of data elements. The classification of data elements can comprise, e.g., a malicious classification for data elements associated with a malicious process.

At operation 408, the prefilter configuration workflow 300 can identify second data elements, e.g., the prefilter data element(s) 326, based on the confidence values determined at operation 406. The second data elements can comprise a subset of the first data elements processed at operation 406, namely, the second data elements can comprise the data elements having confidence values that satisfy a threshold confidence value 322.

At operation 410, the prefilter configuration workflow 300 can configure a prefilter based on the second data elements identified at operation 408. The prefilter can be configured to identify third data elements that are similar to the second data elements; for example, the third data elements can comprise data elements in the production data 340 of a type similar to the second data elements. In an example, configuring the prefilter can comprise performing a statistical analysis of the second data elements in order to identify types of data elements included in the second data elements. Example statistical analyses can identify either an absolute or a relative prevalence of different process tree types and can compare the absolute or relative prevalence against a prevalence threshold.

The prefilter configured at operation 410 can optionally comprise a multistage prefilter, such as the prefilter 210, which is configured to use a multistage process to identify the third data elements. In some embodiments, the prefilter can comprise at least one allow list or at least one exclusions list which allows some data elements while excluding/disallowing others.

The prefilter resulting from prefilter configuration 404 can be provided to data classification 412 for use of the configured prefilter. At operation 414, the prefilter can be applied to a second data volume, for example, to production data 340, resulting in a reduced second data volume comprising one or more of the third data elements (the data elements from the production data 340 that are similar to those included in the prefilter) identified within the second data volume. The second data volume can comprise, e.g., telemetry data 128 received from a security sensor such as the security agent 126 deployed in a remote network such as the network(s)/cloud(s) 120.

At operation 416, the trained ML classifier from operation 402 can classify the reduced second data volume output by the prefilter. For example, the trained ML classifier can classify the one or more of the third data elements identified within the second data volume. Classified data elements and/or corresponding alerts can then optionally be reported back to an entity that requested classification, e.g., to the security agent 126.

Figure 5:
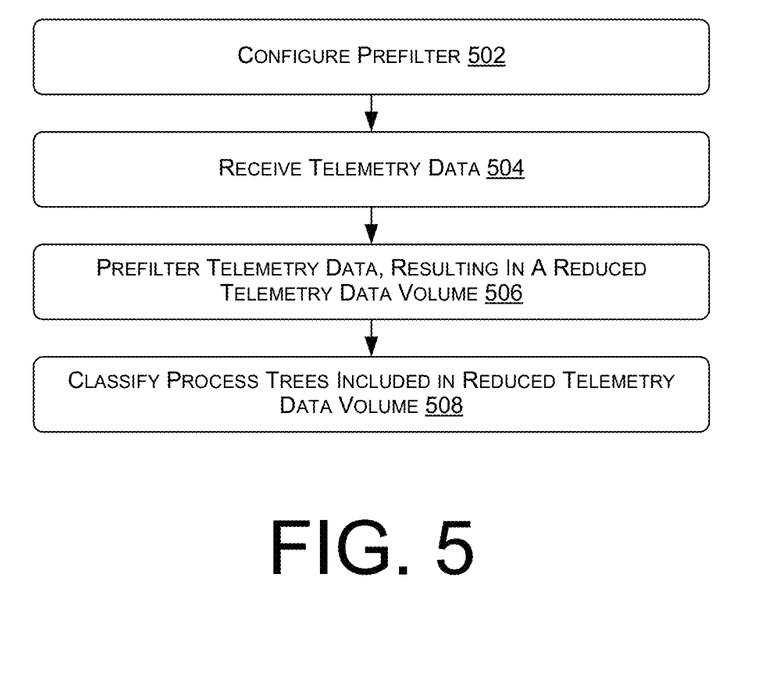
FIG. 5 illustrates an example process to use a prefilter in a context comprising telemetry data, in accordance with an embodiment of the present disclosure.

FIG. 5 illustrates an example process to use a prefilter in a context comprising telemetry data, in accordance with an embodiment of the present disclosure. By way of example and without limitation, the process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

The operations illustrated in FIG. 5 can be performed at least in part by a security service 200 such as illustrated in FIG. 2. At operation 502, the prefilter configuration workflow 240 can configure the prefilter 210. Configuring the prefilter 210 can comprise, e.g., classifying, by a trained ML classifier, first process trees in a first data volume (such as the data subset 324) in order to identify process trees associated, by the trained ML classifier, with at least a threshold confidence (e.g., satisfying the threshold confidence value 322) of being associated with a malicious process. The prefilter 210 can be configured to identify process trees matching one or more process tree types of the identified process trees.

In some examples, as illustrated in FIG. 2, the prefilter 210 can comprise a multistage prefilter configured to use a multistage process to identify process trees matching the one or more process tree types. In further examples, the prefilter can comprise at least one allow list and/or at least one exclusions list. For example, an allow list and/or an exclusions list may be implemented at each of the prefilter stages.

At operation 504, the security service 200 can receive telemetry data 128 from a security sensor, e.g., from a security agent 126, deployed in a remote network such as the network(s)/cloud(s) 120.

At operation 506, the security service 200 can use the prefilter 210 to prefilter the telemetry data 128 received at operation 504, resulting in a reduced telemetry data volume. The magnitude of the data volume reduction depends on the configuration of the prefilter 210 and can be adjusted by reconfiguring the prefilter 210 and/or by applying additional prefilter configuration 242.

At operation 508, the security service 200 can classify process trees included in the reduced telemetry data volume. In an example, the process trees can be classified according to confidence of the process trees being associated with the malicious process. However, the disclosed techniques can also be applied in connection with any classification scenarios.

Figure 6:
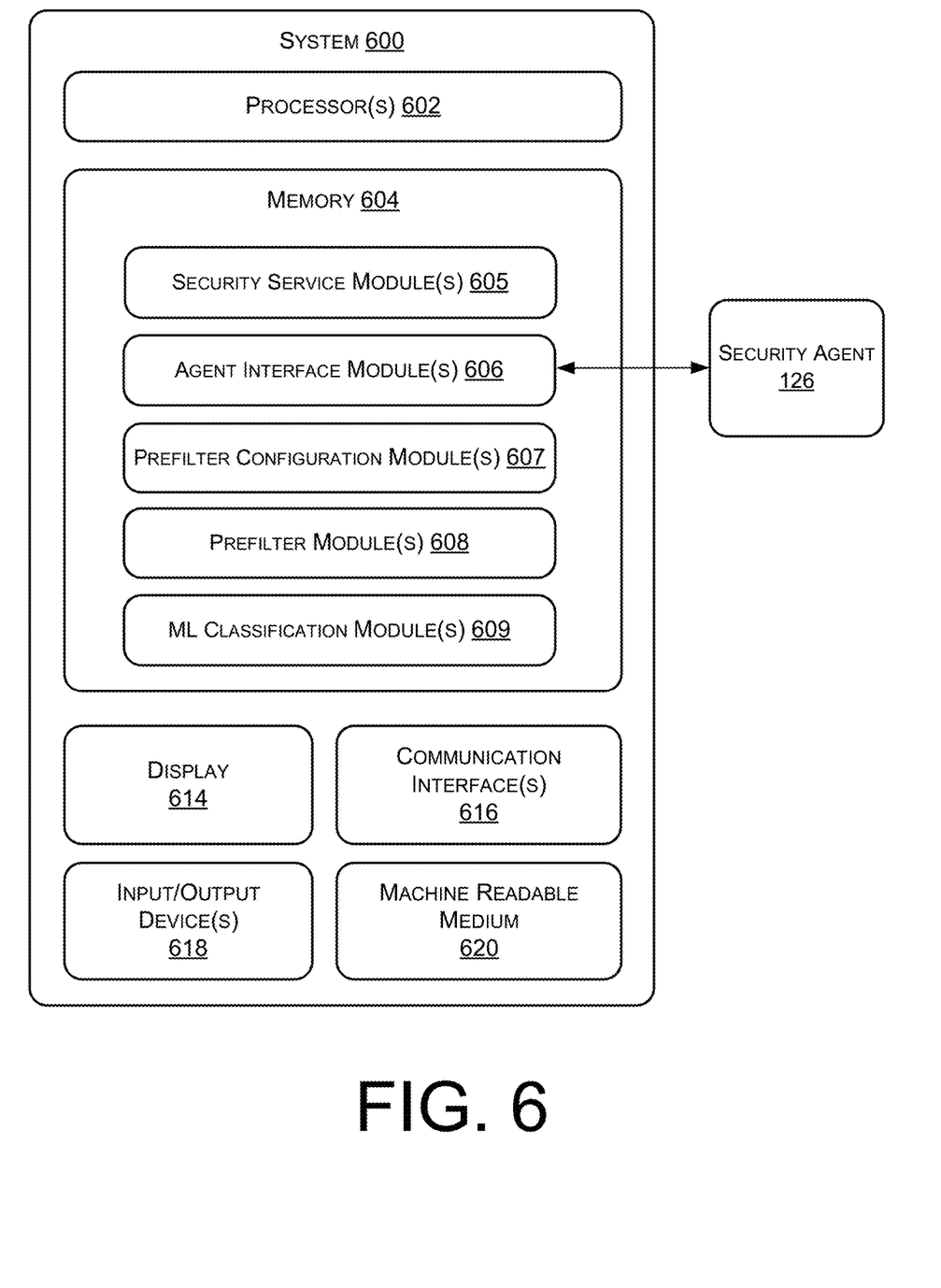
FIG. 6 illustrates an example system configured for data prefiltering and classification, in accordance with an embodiment of the present disclosure.

FIG. 6 illustrates an example system configured for data prefiltering and classification, in accordance with an embodiment of the present disclosure. The example system 600 can be implemented as one or more computing devices as may be included in a security service 130, as illustrated in FIG. 1.

As illustrated in FIG. 6, a system 600 may comprise processor(s) 602, a display 614, communication interface(s) 616, input/output device(s) 618, and/or a machine readable medium 620. Furthermore, the system 600 can comprise a memory 604 storing security service module(s) 605, agent interface module(s) 606, prefilter configuration module(s) 607, prefilter module(s) 608, and ML classification module(s) 609. The agent interface module(s) 606 can optionally interact with a security agent 126, introduced in FIG. 1, which can optionally be implemented separately from the system 600.

In various examples, the processor(s) 602 can be a central processing unit (CPU), a graphics processing unit (GPU), or both CPU and GPU, or any other type of processing unit. Each of the one or more processor(s) 602 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 602 may also be responsible for executing all computer applications stored in memory 604, which can be associated with common types of volatile (RAM) and/or nonvolatile (ROM) memory.

In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the system 600. Any such non-transitory computer-readable media may be part of the system 600.

The memory 604 can include module(s) which, when executed, cause the processor(s) 602 to perform actions described herein. The security service module(s) 605, agent interface module(s) 606, prefilter configuration module(s) 607, prefilter module(s) 608, and ML classification module(s) 609 can comprise modules that cause the processor(s) 602 to perform functions of components illustrated and described in FIGS. 1-5.

Display 614 can be a liquid crystal display or any other type of display commonly used in the system 600. For example, display 614 may be a touch-sensitive display screen and can then also act as an input device or keypad, such as for providing a soft-key keyboard, navigation buttons, or any other type of input. Input/output device(s) 618 can include any sort of output devices known in the art, such as display 614, speakers, a vibrating mechanism, and/or a tactile feedback mechanism. Input/output device(s) 618 can also include ports for one or more peripheral devices, such as headphones, peripheral speakers, and/or a peripheral display. Input/output device(s) 618 can include any sort of input devices known in the art. For example, input/output device(s) 618 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The communication interface(s) 616 can include transceivers, modems, interfaces, antennas, and/or other components that perform or assist in exchanging radio frequency (RF) communications with base stations of the telecommunication network, a Wi-Fi access point, and/or otherwise implement connections with one or more networks.

The machine readable medium 620 can store one or more sets of instructions, such as software or firmware, which embody any one or more of the methodologies or functions described herein. The instructions can also reside, completely or at least partially, within the memory 604, processor(s) 602, and/or communication interface(s) 616 during execution thereof by the system 600. The memory 604 and the processor(s) 602 also can constitute machine readable media 620.

The various techniques described herein may be implemented in the context of computer-executable instructions or software, such as program components, which are stored in computer-readable storage and executed by the processor(s) of one or more computing devices such as those illustrated in the figures. Generally, program components include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, comprising:
   classifying, by a trained machine learning classifier, first data elements in a first data volume;
   wherein the trained machine learning classifier classifies the first data elements by assigning confidence values representing confidence that the first data elements belong in a classification of data elements;
   identifying second data elements based on the confidence values, wherein the second data elements comprise a subset of the first data elements having confidence values that satisfy a threshold confidence value;
   subsequent to identifying the second data elements, configuring a prefilter based on the second data elements, so that the prefilter is configured based on previously identified second data elements which were identified at least in part via the trained machine learning classifier;

applying the prefilter to a second data volume, resulting in a reduced second data volume comprising third data elements identified within the second data volume; and classifying, by the trained machine learning classifier, the reduced second data volume by classifying the third data elements identified within the second data volume, wherein the reduced second data volume is classified by the trained machine learning classifier at a reduced computational expense which is less than a computational expense of classifying the second data volume.

2. The method of claim 1, further comprising training a machine learning classifier on a training data volume, resulting in the trained machine learning classifier.

3. The method of claim 1, wherein the first data elements, the second data elements, and the third data elements comprise process trees.

4. The method of claim 1, wherein the classification of data elements comprises a malicious classification for data elements associated with a malicious process.

5. The method of claim 1, wherein the prefilter comprises a multistage prefilter configured to use a multistage process to identify the third data elements.

6. The method of claim 1, wherein the prefilter comprises one or more of at least one allow list or at least one exclusions list.

7. The method of claim 1, wherein configuring the prefilter comprises performing a statistical analysis of the second data elements in order to identify at least one type of data element included in the second data elements.

8. The method of claim 1, wherein the second data volume comprises telemetry data received from a security sensor deployed in a remote network.

9. A system, comprising:
a processor, and
at least one memory storing instructions executed by the processor to perform actions including:
applying a prefilter to a second data volume, resulting in a reduced second data volume comprising one or more third data elements identified within the second data volume;
wherein the prefilter is configured according to a process comprising:
classifying, by a trained machine learning classifier, first data elements in a first data volume;
wherein the trained machine learning classifier classifies the first data elements by assigning confidence values representing confidence that the first data elements belong in a classification of data elements;
identifying second data elements based on the confidence values, wherein the second data elements comprise a subset of the first data elements having confidence values that satisfy a threshold confidence value; and
subsequent to identifying the second data elements, configuring the prefilter based on the second data elements so that the prefilter is configured based on previously identified second data elements which were identified at least in part via the trained machine learning classifier, whereby the prefilter is configured to identify the one or more third data elements; and
classifying, by the trained machine learning classifier, the reduced second data volume by classifying the one or more of the third data elements identified within the second data volume, wherein the reduced second data volume is classified by the trained machine learning classifier at a reduced computational expense which is less than a computational expense of classifying the second data volume.

10. The system of claim 9, wherein the prefilter is configured to identify the one or more third data elements based on a comparison of the one or more third data elements to the second data elements.

11. The system of claim 9, wherein the first data elements, the second data elements, and the third data elements comprise process trees.

12. The system of claim 9, wherein the classification of data elements comprises a malicious classification for data elements associated with a malicious process.

13. The system of claim 9, wherein the prefilter comprises a multistage prefilter configured to use a multistage process to identify the third data elements.

14. The system of claim 9, wherein the prefilter comprises one or more of at least one allow list or at least one exclusions list.

15. The system of claim 9, wherein configuring the prefilter comprises performing a statistical analysis of the second data elements in order to identify at least one type of data element included in the second data elements.

16. The system of claim 9, wherein the second data volume comprises telemetry data received from a security sensor deployed in a remote network.

17. A non-transitory computer-readable storage medium storing computer-readable instructions, that when executed by a processor, cause the processor to perform actions comprising:
receiving telemetry data from a security sensor deployed in a remote network;
prefiltering the telemetry data, resulting in a reduced telemetry data volume;
wherein prefiltering the telemetry data comprises applying a prefilter configured to identify process trees matching one or more process tree types, and
wherein the one or more process tree types are based on identified process trees associated, by a trained machine learning classifier, with at least a threshold confidence of being associated with a malicious process, so that the prefilter is configured based on the identified process trees which were identified at least in part via the trained machine learning classifier; and
classifying process trees included in the reduced telemetry data volume according to confidence of the process trees included in the reduced telemetry data volume being associated with the malicious process, wherein the reduced telemetry data volume is classified at a reduced computational expense which is less than a computational expense of classifying the telemetry data.

18. The non-transitory computer-readable storage medium of claim 17, wherein the prefilter comprises a multistage prefilter configured to use a multistage process to identify the process trees matching the one or more process tree types.

19. The non-transitory computer-readable storage medium of claim 17, wherein the prefilter comprises one or more of at least one allow list or at least one exclusions list.

20. The non-transitory computer-readable storage medium of claim 17, wherein the actions further comprise configuring the prefilter at least in part by classifying, by the trained machine learning classifier, first process trees in a first data volume in order to identify the identified process trees.

* * * * *